No. 643,883. Patented Feb. 20, 1900.
A. E. NIELSEN.
FARE REGISTER.
(Application filed July 19, 1899.)
(No Model.) 7 Sheets—Sheet 1.

Witnesses Inventor
Anton E. Nielsen
Attorney

No. 643,883. Patented Feb. 20, 1900.
A. E. NIELSEN.
FARE REGISTER.
(Application filed July 19, 1899.)
(No Model.) 7 Sheets—Sheet 2.

Fig. 4.

Witnesses
Inventor
Anton E. Nielsen
Attorney

No. 643,883. Patented Feb. 20, 1900.
A. E. NIELSEN.
FARE REGISTER.
(Application filed July 19, 1899.)
(No Model.) 7 Sheets—Sheet 3.

No. 643,883. Patented Feb. 20, 1900.
A. E. NIELSEN.
FARE REGISTER.
(Application filed July 19, 1899.)
(No Model.) 7 Sheets—Sheet 5.

No. 643,883. Patented Feb. 20, 1900.
A. E. NIELSEN.
FARE REGISTER.
(Application filed July 19, 1899.)
(No Model.) 7 Sheets—Sheet 6.

Witnesses
A. M. Long
Arthur E. Fowler

Inventor
Anton E. Nielsen
Attorney

No. 643,883. Patented Feb. 20, 1900.
A. E. NIELSEN.
FARE REGISTER.
(Application filed July 19, 1899.)
(No Model.) 7 Sheets—Sheet 7.

Witnesses
Inventor
Anton E. Nielsen,
Attorney

UNITED STATES PATENT OFFICE.

ANTON E. NIELSEN, OF NEW YORK, N. Y., ASSIGNOR TO THE STERLING SUPPLY AND MANUFACTURING COMPANY, OF SAME PLACE.

FARE-REGISTER.

SPECIFICATION forming part of Letters Patent No. 643,883, dated February 20, 1900.

Application filed July 19, 1899. Serial No. 724,375. (No model.)

*To all whom it may concern:*

Be it known that I, ANTON E. NIELSEN, a citizen of the United States of America, and a resident of the city of New York, borough of Brooklyn, in the State of New York, have invented a new and useful Improvement in Fare-Registers, of which the following is a specification.

This invention relates primarily to the combination within a single casing of two or more trains of registering mechanism, each comprising a bell, a primary counter or trip register, and a totalizer or permanent register in connection with a setting mechanism and a visual trip-signal of the direction-indicator type, common to all. Some parts of the invention may, however, be embodied in registers of other types, especially those in which motion is transmitted to a pair of registering-trains by parallel actuator-slides, those in which peripherally-numbered cylinders or numeral-wheels are employed in the primary register or that of each registering-train, those in which a bell-hammer is retracted by a ratchet-wheel rotated step by step, and those in which a rotary setting-knob is unlocked by an inward thrust and serves to lock a pair of actuator-slides or their equivalent and to actuate the trip-signal or direction-indicator as well as to turn one or more trip-registers to zero.

The invention consists in certain novel combinations of parts hereinafter set forth and claimed. Its objects are the registration at will of one of two or more kinds of fares, and particularly either of two kinds, as "cash-fares" and "transfers," by means of one and the same mainspring put in tension by the operator, the prevention of any movement of the registers and bell mechanism or either of them by the spring-energizing stroke of either actuator, the simultaneous registration of each fare on a trip-register and a permanent register during the return movements, the tripping of the appropriate bell-hammer by power transmitted from a main ratchet-wheel as the parts come to rest after each registration, the periodical correction automatically of the alinement of the teeth of a pair of ratchet-wheels connected, respectively, with the units-wheels of a trip-register and a permanent register, the unlocking and relocking of the numeral-wheels of the appropriate primary register before and after successive actuations and the prevention of overmovements by the same means, the actuation of the tens-wheels of the primary register by inclosed clutch mechanism in a positive manner and without any space between the wheels, the simultaneous locking of a pair of actuators preliminary to setting the trip-registers, the simultaneous release of all the numeral-wheels of the trip-register or trip-registers for the setting operation, the adaptation of one or more pairs of such wheels to be simultaneously set to zero through the medium of a splined shaft common to all and inclosed connecting devices, the arrest of the setting-shaft and of such wheels individually at zero by peculiar means, the adaptation of the setting mechanism by improved means to change the direction-indicator at each setting movement for the next trip, the adaptation of the permanent registers to be readily detached individually to facilitate inspection and repairs, and generally the adaptation of the improved register to be strongly constructed, free from liability to disarrangement in use, and safe against fraudulent manipulation, with provision for quickly replacing any part that becomes broken or inoperative.

Seven sheets of drawings accompany this specification as part thereof.

Like letters and numbers refer to like parts in all the figures.

Figures 1, 2, 3:
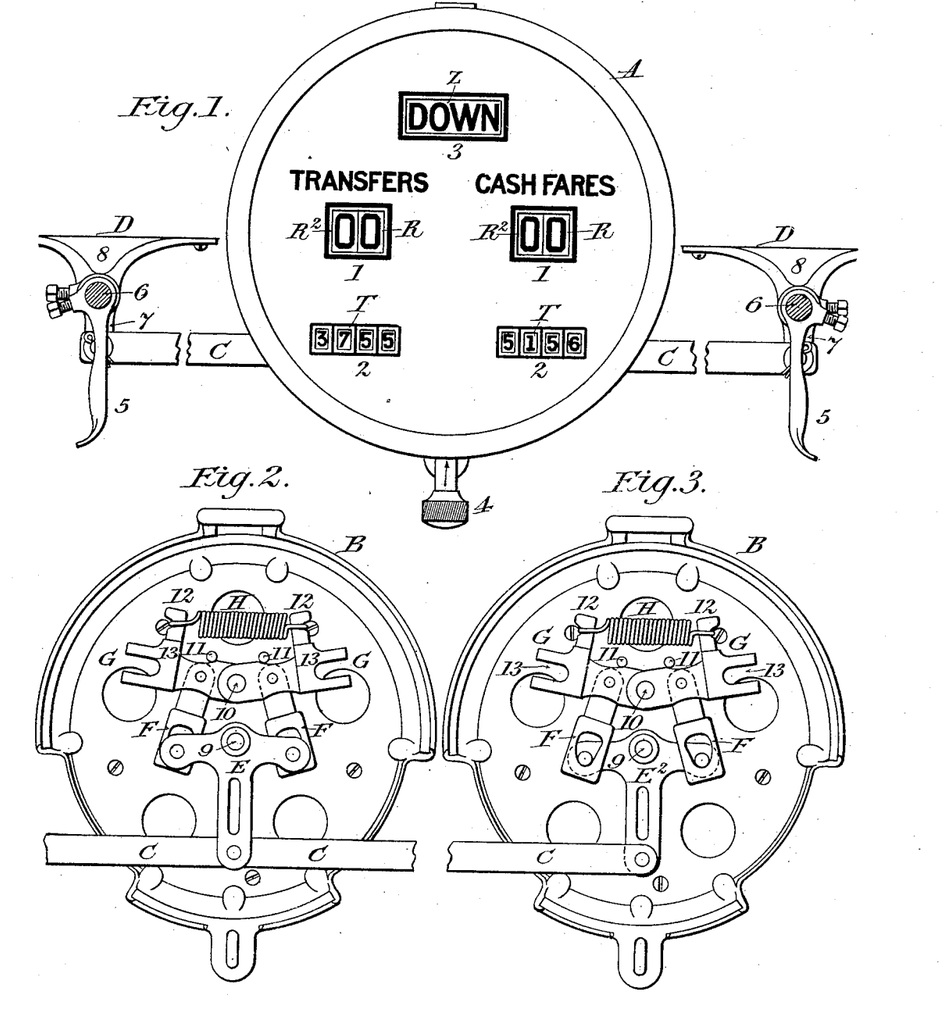
Figure 1 of the drawings is a face view of the improved register with corresponding views of a pair of rod ringing devices connected therewith.
Figs. 2 and 3 are face views of the register-back with the register proper detached, the connections with one ringing device being removed in Fig. 3.
Figure 4:
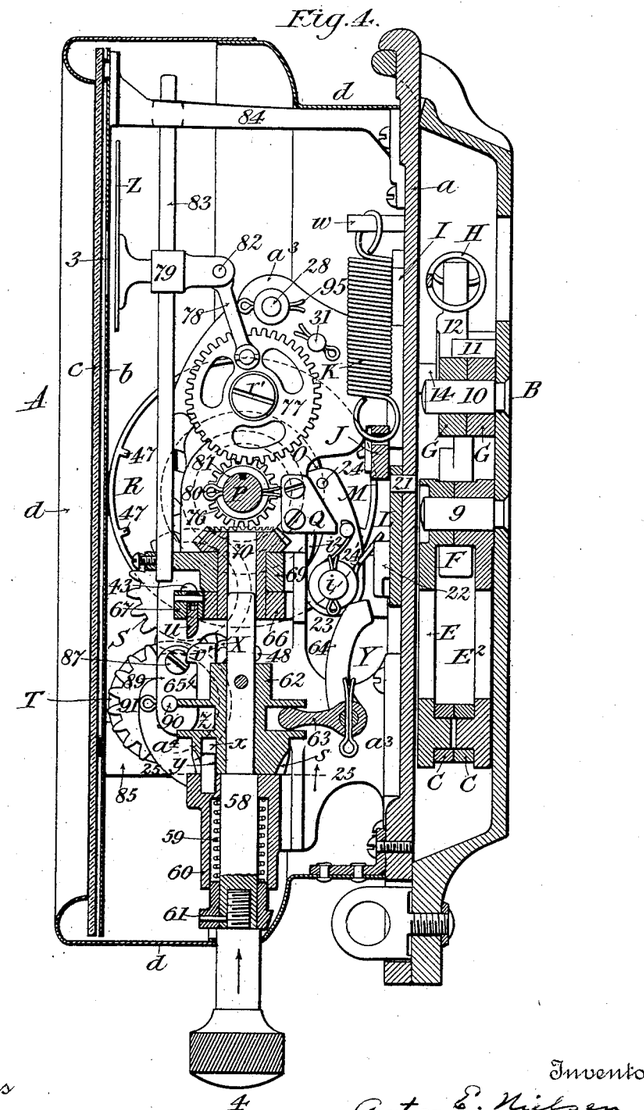
Fig. 4 is a central longitudinal section through the register proper and register-back with some of the parts in the plane of section in elevation.

The improved register (shown complete at A in Figs. 1 and 4) incloses within one casing a pair of duplex registering mechanisms of the numeral type throughout, the indications of each trip-register and permanent register being successively exposed to view, respectively, through dial-openings 1 and 2, Fig. 1, under appropriate inscriptions, as "Transfers" and "Cash fares," together with the direction indication of a trip-signal, seen through a dial-opening 3, Figs. 1 and 4. The knob 4 of a rotary setting mechanism common to both trip-registers, protruding at bottom, completes the external features of the improved register.

The register is hung in customary manner by means of a register-back B, Figs. 2, 3, and 4, fastened by wood-screws within the end of a street-car and inclosing motion-converting devices which connect with the actuator-slides of the respective registering mechanisms and are connected by links C with a pair of ringing devices D, if it be an open car, or with a single ringing device, as in Fig. 3, in a closed car. These appurtenances of the improved register may be of any approved make; but for clearness those shown in Figs. 1 to 4, inclusive, will be briefly described.

A pair of "rod" ringing devices are shown at D. Each comprises a convenient number of lever-handles 5, clamped on a rock-shaft or rod 6, which extends lengthwise of the car and carries at the register end a crank-arm 7, which is pinned to the outer end of the connecting-link C. Hangers 8 support the rod 6 at suitable intervals. The inner end of each link is coupled to the lower end of a T-shaped lever E or $E^2$. Both of these levers are pivoted on a stud 9 within the back B and coact in common with the slotted lower ends of a pair of swinging links F. These depend from a pair of fork-levers G, that are pivoted in common on a stud 10 and are drawn against stop-pins 11 by a spiral spring H, that is stretched between rigid arms 12 on said fork-levers.

Figures 6, 7, 8:
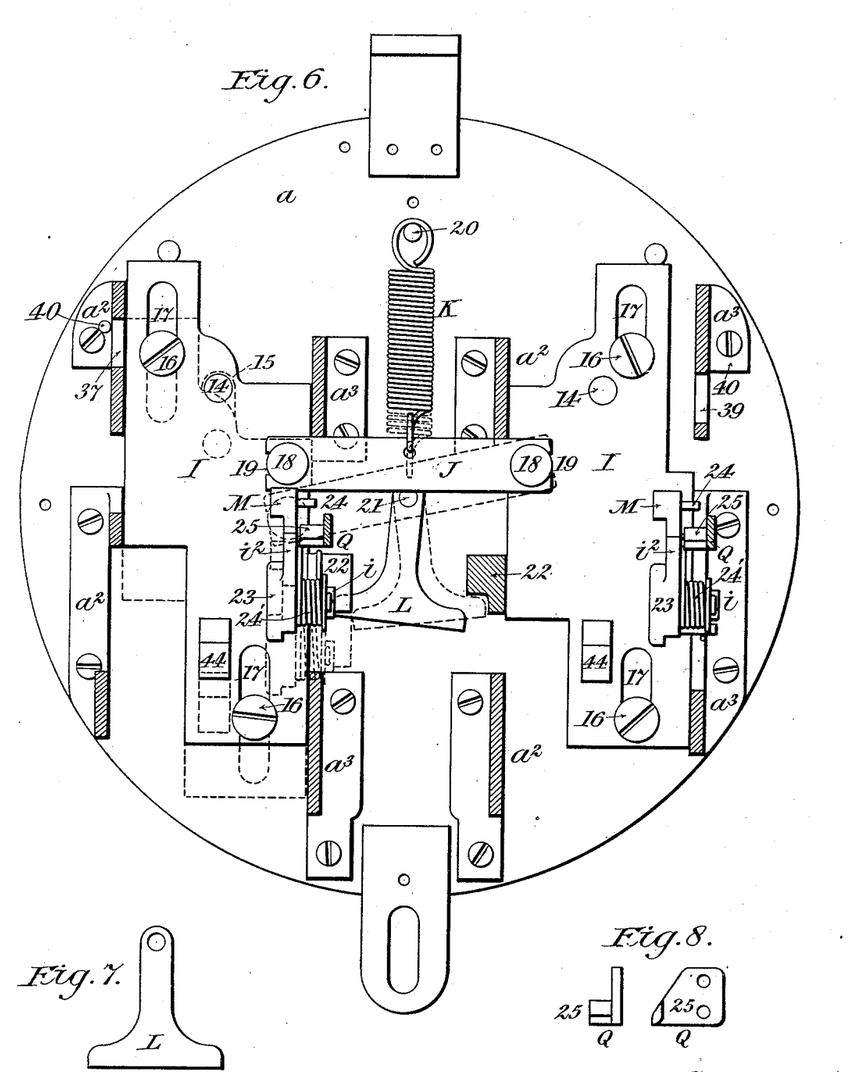
Fig. 6 is a sectional face view showing the back plate of the register proper and the parts immediately in front of said back plate.
Fig. 7 is a face view of a locking-lever, partly concealed in Fig. 6.
Fig. 8 is a corresponding edge view of the right-hand main-pawl guard, with a view of its inner side projected therefrom.
Figure 9:
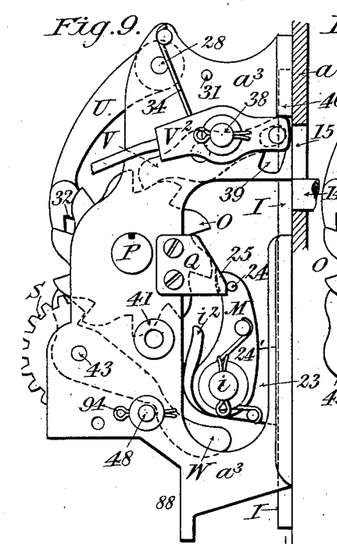
Figs. 9 to 11, inclusive, are a series of fragmentary views from the right-hand side of the register, illustrating the operation of the main ratchet-wheels.
Figure 10:
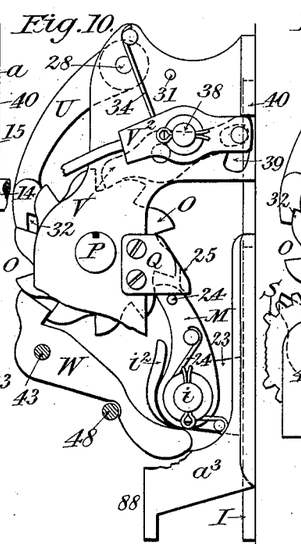

The forks 13 of the levers G engage readily with stud-pins 14, Figs. 4 and 6, on the backs of a pair of actuator-slides I within the register A when the parts are at rest in their normal positions, said stud-pins projecting through parallel slots 15, Figs. 6 and 9, in the back plate $a$ of the register.

As above organized, when either of the lever-handles 5, Fig. 1, is pressed inward (toward the center of the car) the near slide I is pulled and the near registering mechanism is actuated, and when either lever-handle is turned outward (toward the side of the car) the far slide I and the far registering mechanism is actuated. Either of the slides I may thus be pulled at will by means of either of the ringing devices D.

The slides I are held against the back plate $a$ and guided in vertical paths by screws 16 and slots 17, Fig. 6, and are provided with headed studs 18 to coact with notches 19 in the ends of a lever cross-bar J, to the middle of which a mainspring K is connected. This spring is conveniently and preferably a strong spiral spring stretched from a stud 20 on the back plate $a$. It is put in tension by the movement of either of the slides I, (represented by dotted lines at the left in Fig. 6,) and the return movement, effected by the spring, is the registering and bell-ringing stroke.

To prevent pulling either slide before the return movement of the other is completed, any approved device may be employed. For example, a ⊥-shaped locking-lever L, Figs. 6 and 7, swings from a stud 21 on the back plate $a$ between the two slides and coacts with recessed lateral projections 22 on the inner edges of the slides, as in Fig. 6. When either slide is pulled, the lever L is cammed outward by the recess in the projection 22 on that slide into locking coaction with the recess of the projection 22 of the other slide, the solid edge of the projection on the moving slide riding in contact with the cammed-out extremity, as in dotted lines in Fig. 6, so as to maintain the locked condition until the return movement of the moving slide is completed. Then either slide is again free to move.

Each of the slides I carries on its face, near its right-hand edge, a peculiarly-shaped projection 23, Figs. 4, 6, and 9 to 11, to which a main pawl M is pivoted by a horizontal stud $i$, which also supports the coil of a pawl-spring 24', the respective ends of which spring engage stud-pins on the projection 23 and the pawl M, respectively. Each of the pawls M is thus pressed against the peripheries of a pair of ratchet-wheels N and O, rotatable upon a horizontal main shaft P, Figs. 4, 5, 9, &c., that extends across the register and is supported by bearings in two pairs of frame-pieces $a^2$ and $a^3$, attached to the back plate $a$.

Figure 18:
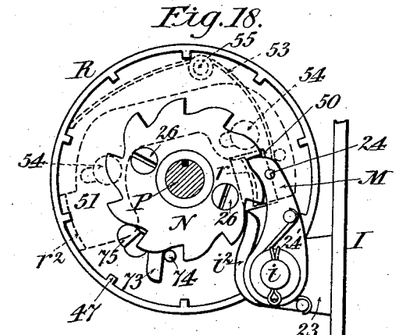
Fig. 18 is a fragmentary side view of the same, illustrating with the aid of dotted outlines of inclosed parts the operation of the tens-wheel.

When the parts are at rest in normal position, the nose of each of the pawls M occupies an interdental notch in each of the ratchet-wheels N and O, as in Fig. 18, and a rigid spur $i^2$ on the projection 23 extends into the succeeding notch in contact with the backs of the teeth of the ratchet-wheel O to lock this wheel after each actuation.

It will be understood that all registering and bell-ringing impulses are transmitted from the slides I through the medium of said main pawls M and ratchet-wheels N and O. To insure complete reciprocations of said pawls M by means of said slides I and to prevent the transmission of any motion whatever to said ratchet-wheels N and O, or either of them, during the spring-energizing movements of said slides, the nose end of each of said pawls M is provided with a laterally-projecting stud-pin 24, Figs. 4, 6, &c., and the right-hand frame-piece $a^3$ of each pair of frame-pieces is provided with a safety attachment Q. One of these is shown detached by Fig. 8. Each of them is constructed with a laterally-projecting incline 25 to coact with one of said stud-pins 24 in the manner illustrated by Fig. 9, which shows a main pawl M so guided out of contact with the matching pair of ratchet-wheels as it appears during each spring-energizing movement. There is consequently no effect whatever on any part of the registering-train (including the bell mechanism) beyond the main pawl M during such first stroke of each slide I, and such stroke must be fully completed in order that any effects may follow. Said ratchet-wheels N are directly attached by screws 26, Fig. 18, to the units-wheels R of the trip-registers, and said ratchet-wheels O are connected by spur-gearing S with the units-wheels of a pair of positive-motion totalizers or permanent registers T. Each fare is thus simultaneously registered by both registers of the appropriate train.

Figures 5, 30, 31:
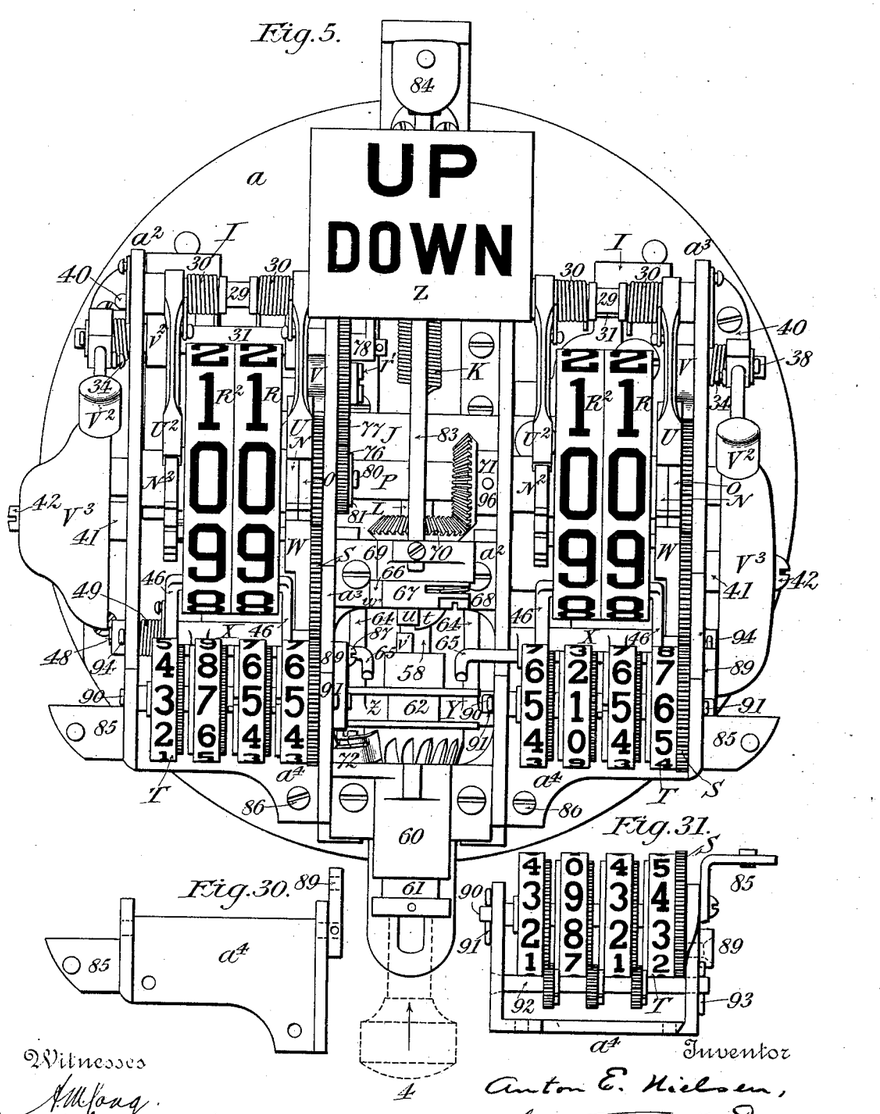
Fig. 5 is a general face view of the register proper from a plane immediately behind the dial-plate with the register-casing removed.
Fig. 30 is a top view of the frame of the left permanent register.
Fig. 31 is an elevation of the right permanent register.
Figure 11:
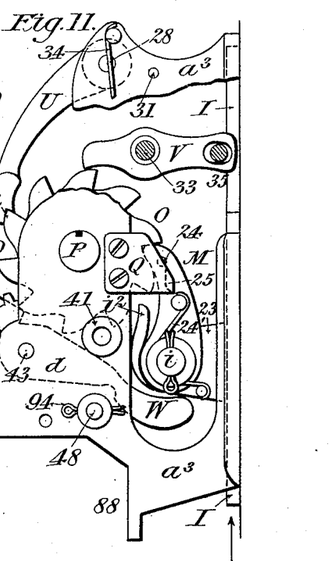
Figures 12, 13, 15:
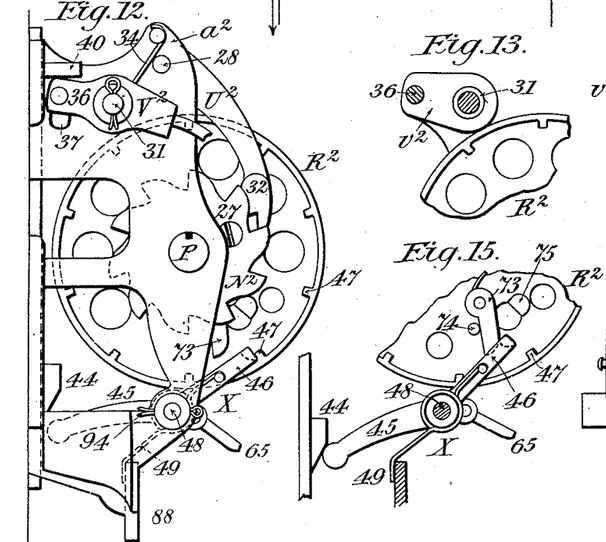
Figs. 12 to 14, inclusive, are a fragmentary view from the left-hand side of the register and cross-sections through the rock-shaft of the left bell-hammer in successive parallel planes.
Fig. 15 is a cross-section through the pivot of the left wheel-lock with the left actuator-slide in its lowermost position.

A pair of ratchet-wheels $N^2$ are attached by screws 27, Fig. 12, to the tens-wheels $R^2$ of the trip-registers, and spring-pressed detent-pawls U and $U^2$, Figs. 5, 9, &c., at the front of the register are normally interlocked, respectively, with said ratchet-wheels N and O and $N^2$ and assist to hold the same steady during the spring-energizing strokes and to return them to normal position after incomplete movements should "jigging" be attempted during the return strokes of the slides. The detent-pawls U $U^2$ of each registering-train are conveniently pivoted in common on a pivot-rod 28, Figs. 4, 9, &c., provided between them with a separating-sleeve 29, Fig. 5, and their springs 30 are coiled around their hubs, as in Fig. 5, and coact with parallel rods 31, supported by the frame-pieces $a^2$ and $a^3$, behind said pivot-rods 28, and with inwardly-projecting studs on the respective pawls. To further guard against the success of attempts to ring either bell more than once for a registration by jigging, the detent-pawls N are provided with catch-notches 32, Figs. 9 to 12, that lock the ratchet-wheels N and O, as in Fig. 11, against retrogression should the registering stroke be reversed when nearly completed.

Figure 14:
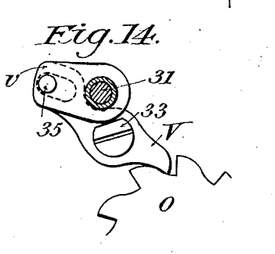

Lever-pawls V, Figs. 5, 9, &c., forming part of the bell mechanisms of the registering-trains, are pivoted by shouldered screws 33, Figs. 11 and 14, to the right-hand frame-pieces $a^3$ and coact with the ratchet-wheels O, against which they are pressed by springs 34, coiled around the hubs of bell-hammers $V^2$ and coacting with stud-pins on said frame-pieces and on the bell-hammers, respectively. Motion is transmitted to and from each lever-pawl through a slot and pin 35. (Best seen in Fig. 14.) The left lever-pawl shown in this figure coacts directly with a crank-arm $v$ on the left rod 31, which is a sleeved rock-shaft and carries a second crank-arm $v^2$, Fig. 13, adjacent to the outer frame-piece on its sleeve and the left bell-hammer $V^2$ on the outer end of its inner rod, these two being connected by a crank-pin 36, Figs. 12 and 13, which projects outward through a slot 37 in the interposed frame-piece $a^2$. The right bell-hammer is pivoted on a stud 38, Figs. 5, 9, &c., on the frame-piece $a^3$ of the right or cash-fare registering-train and is connected directly with the right bell-lever by the slot and pin 35, Fig. 11, the pin projecting outward through a slot 39 in said frame-piece $a^3$. Both bell-hammers in the effective movements and after each stroke coact with stops 40 on the outer frame-pieces. They are tripped by the ratchet-wheels O as they come to rest after successive registrations, which are thus attested in customary manner by strokes on bells $V^3$, Fig. 5, within the register-casing. These bells are preferably and conveniently of different shapes, as shown in Fig. 5, so as to have different tones. They are supported in common by studs 41 on the outer frame-pieces, to which they are attached by screws 42. Each pair of main ratchet-wheels N and O is further engaged by a safety-dog W, Figs. 5 and 9 to 11, which is pivoted on a shouldered screw at 43, Figs. 9 to 11, and pressed against the peripheries of the wheels, as in Fig. 10, at the lower limit of the first stroke of the slide I of its train by the coaction with the rear end of the dog of the projection 23 on said slide. The teeth of the respective ratchet-wheels N and O of each pair are thus periodically alined with each other after each pull on the slide I coacting therewith, and any disarrangement of either wheel by jigging is at once corrected.

Figure 16:
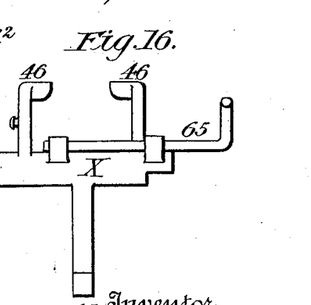
Fig. 16 is a view of the left wheel-lock detached.

Simultaneously with the actuation of one of the safety-dogs W, or substantially so, an incline 44, Figs. 6, 12, and 15, on the moving slide I completes, as in Fig. 15, a swinging movement of a locking device X, (shown detached by Fig. 16,) so as to unlock the register-wheels R R² of that train for the registering impulse that is to follow immediately. Each of these locking devices X is in the form of a hollow rock-shaft, with a rearwardly-projecting arm 45 to coact with the incline 44, and a pair of forwardly-projecting arms 46, rebent at their extremities toward each other to coact with inwardly-projecting stops 47 on the laterally-projecting rims of the register-wheels R and R² of its train. The locking device is pivoted on a horizonal rod 48, and its arms 46 are pressed or drawn into the paths of said stops 47 by a spring 49. This spring may be coiled on the shaft of the device and coact with studs on the adjacent frame-piece and on the near arm 46, as in Figs. 5, 12, and 15, or may be a spiral spring stretched from the locking device to a relatively-fixed stud. As the moving slide I retires the incline 44 the spring 49 restores the locking device to effective position, where it next coacts with the succeeding pair of the stops 47 to limit the registering movement of the wheels R and R², so as to prevent any overmovement of either of them.

Figure 17:
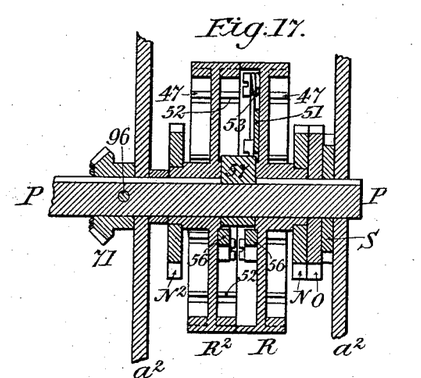
Fig. 17 is a section through the right primary register at zero in a plane parallel to the dial-plate.
Figure 19:
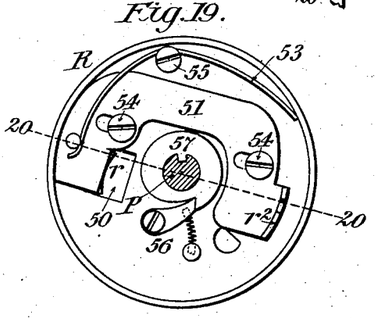
Fig. 19 is a view of the inside of the units-wheel and the parts within the same.
Figure 20:
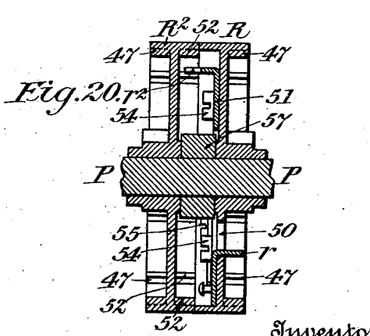
Fig. 20 is a section through both wheels and the parts between on the line 20 20, Fig. 19.
Figure 21:
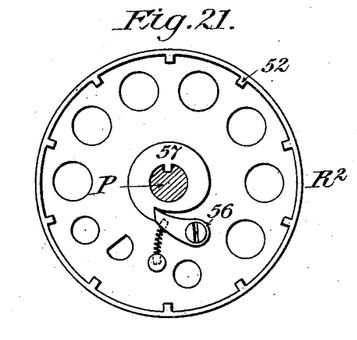
Fig. 21 is a view of the inside of the tens-wheel.

The tens-weeel R² of each train is turned at the proper intervals by peculiar means. (Illustrated by Figs. 17 to 20.) The parts are shown in Figs. 17 and 18 at rest, with both wheels R R² of the train at zero. In this position the nose of the main pawl M presses upon a projection $r$, Fig. 20, which protrudes through a hole 50 in the web of the units-wheel R from a clutch-slide 51 within the otherwise-closed recess formed between the webs of the pair of wheels by their adjoining rims, as in Figs. 17 and 20. Diametrically opposite said projection $r$ a notched projection $r^2$ interlocks with one of ten inwardly-projecting spurs 52 on the inner rim of the tens-wheel R², similar in form to said stops 47 on the outer rims of both wheels, and the pair of wheels is thus locked together. When the pawl M is retracted for the succeeding registering impulse, the clutch-slide 51 is retracted, as in Figs. 19 and 20, by a spring 53 within the same recess, and the wheels remain disconnected until nine fares have been registered by the units-wheel R. When the pawl M is retracted preliminary to a tenth registration, the nose of the pawl M again drops into the interdental notch of the coacting ratchet-wheel N, where the projection $r$ is located, and the two wheels are again interlocked by means of the clutch-slide 51, so that during the succeeding registering impulse both will move together to indicate "10." The clutch-slide 51 and spring 53 are conveniently held in place, respectively, within the inner side of the units-wheel by slot-and-screw guides 54 and a screw 55.

The recess between each pair of the wheels R R² serves also to inclose a pair of spring-pressed setting-dogs 56 and a "setting-cam" 57 to coact therewith. In the registering movements of the wheels the dogs 56 are cammed outward by the cam 57, which is stationary during such movements of the wheels, being splined to the normally-stationary main shaft P, on which both pairs of register-wheels R R² rotate freely in their registering movements.

Figure 24:
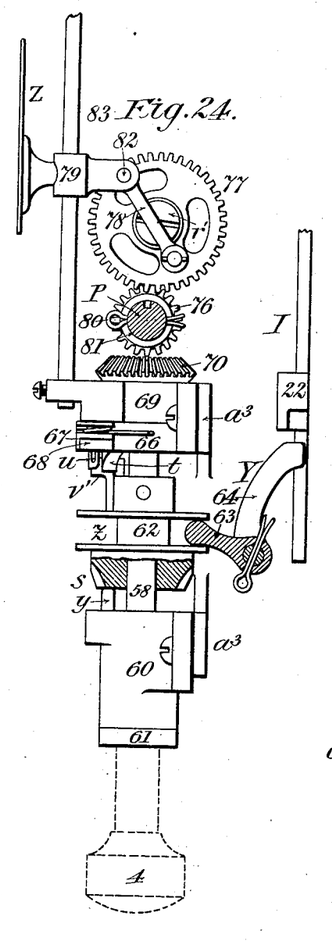
Fig. 24 is a sectional elevation projected from Fig. 23.
Figure 25:
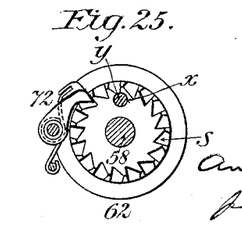
Fig. 25 is a fragmentary section on the line 25 25, Fig. 4, with the parts at zero, showing the lower face of the setting clutch-slide.
Figure 26:
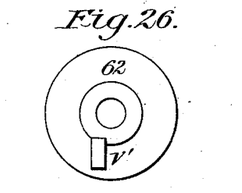
Fig. 26 is a view of the upper end of the setting clutch-slide.
Figure 27:
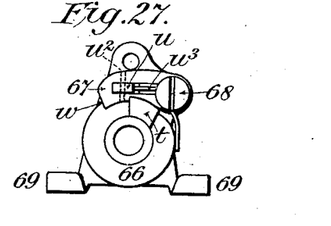
Fig. 27 is an end elevation of the other member of the same clutch with its appurtenances detached.
Figure 28:
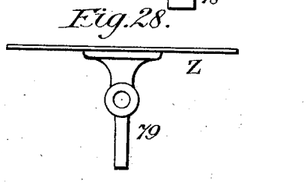
Fig. 28 is a view of the lower edge of the setting-signal detached.

The setting-knob 4, Figs. 1, 4, 5, &c., screws into the lower end of a radial setting-shaft 58, that is normally projected outward by a disconnecting-spring 59, Fig. 4, within its outer bearing 60, reacting against a collar 61 on said setting-shaft, and in this position has no connection whatever with the register-wheels R R² nor with said shaft P. When the setting-knob is pressed inward, as represented by the arrow thereon in Figs. 4 and 5, five effects are produced simultaneously, or substantially so, viz: First, both actuator-slides I are locked by the endwise movement with the setting-shaft 58 of a clutch-slide 62, pinned fast thereto and having a circumferential groove $z$, and the resulting rocking movement of an actuator-lock Y, having a forwardly-projecting arm 63, Figs. 4 and 24, engaging said groove $z$, and a pair of legs 64, that swing into the paths of the lugs 22 on the slides I. Secondly, the register-wheels R R² are unlocked for the setting operation. This is effected by the pressure of the inner end of the clutch-slide 62 against a pair of retracting-bars 65, Figs. 4, 5, 12, &c., attached to the locking devices X for this purpose. The latter are thus turned on the pivot-rods 48, so as to swing their arms 46 out of the paths of the stops 47, as in Fig. 15. Thirdly, the clutch-slide 62 is unlocked, as in Figs. 23 and 24, from said outer bearing 60, to which it is normally locked, as in Figs. 4, 5, and 25, by a pin $y$ and hole $x$, drawn into engagement by said spring 59. Fourthly, the main zero-stop is unlocked for the setting operation. (See Figs. 4, 5, 23, 24, and 27.) The parts of this stop are a peripheral shoulder $w$ on an inner clutch member 66 and a spring-pressed dog 67, pivoted by a shouldered screw 68 to a housing 69, within which said clutch member 66 has its bearing. The dog 67 is lifted to unlock the stop by means of a rigid cam projection $v'$ on the inner face of the clutch-slide 62, engaging a matching projection $u$ on the dog 67, said projection $u$ being rigid in the direction of lift, although movable on a pivot $u^2$, Figs. 23 and 27, within a recess of the dog 67 and held in its effective position by a spring $u^3$, Fig. 27, within said recess, conveniently like the spring of the dog 67, to render it yielding when struck by said projection $v'$ from the position of the latter (represented in Figs. 23 and 24) at the conclusion of the setting operation. Fifthly, the clutch-slide 62 is interlocked, as in Figs. 23 and 24, with said inner clutch member 66 by said projection $v'$ on the former moving into the plane of revolution of a rigid projection $t$ on the face of the clutch member 66. This clutch member is fast on the hub of the first of a pair of bevel-gears 70 71, the second of which is pinned fast to the shaft P, and this shaft is now in positive connection with the setting-knob 4. The knob 4 is next turned in the direction determined by a spring-pressed pawl 72, pivoted to the inner end of said bearing 60, and ratchet-teeth $s$, formed on the outer end of the clutch-slide 62, which movement is preferably and conveniently the same at the wheels R R² as the registering movement. The setting motion is transmitted from the setting-knob 4 through the setting-shaft 58, clutch-slide 62, clutch member 66, bevel-gears 70 and 71, shaft P, setting-cams 57, and setting-dogs 56 to the numeral-wheels R R² of each trip-register, both of which are thus simultaneously set to zero, ("00.")

Figure 22:
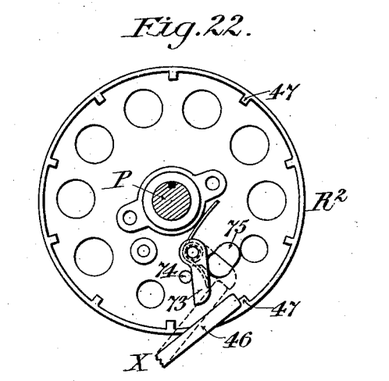
Fig. 22 is a view of the outer side of the tens-wheel, illustrating the operation of the zero stop devices.
Figure 29:
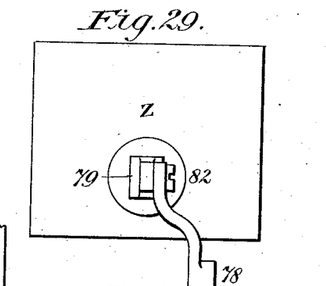
Fig. 29 is a back view of the setting-signal and its pitman.

The trip-register wheels R R² are individually stopped at zero at the conclusion of the setting operation by means of a spring-pressed stop-dog 73, Figs. 12, 15, 18, and 22, pivoted to the outer side of the web of each wheel and normally pressed against a retiring lug 74 on said web, so as to travel clear of the arms 46 of the locking devices X in their normal positions, as in Fig. 12 and in full lines in Fig. 22. With said arms 46 in their retracted positions they project in the paths of the retracted zero-stops 73 and cause the latter to swing to their effective positions against bolster-lugs 75, as in dotted lines in Fig. 22. At the same instant the main zero-stop becomes effective by the contact of the stop-shoulder $w$ with the nose of the dog 67, and the pin $y$ and hole $x$ come into line with each other again, permitting the spring 59, through the collar 61, to retract the setting-shaft 58 and therewith the clutch-slide 62 and actuator-lock Y, which unlocks the slides I and permits the locking device X of each train to resume its normal position, the arms 46 of the latter moving out of engagement with the zero-stop dogs 73 of the register-wheels R R² and into engagement with their stops 47 preparatory to the registrations of a new trip. Meanwhile simultaneous with the setting operation motion has been transmitted from the main shaft P, through the medium of a pinion 76, Figs. 4, 5, 23, and 24, to a spur crank-wheel 77, which turns on a stud-screw $r'$, by which it is attached to the right framepiece $a^3$ of the left registering-train and from the crank-pin of said wheel 77 by a pitman 78 and a slide 79, to which said pitman is pivoted to a direction-indicating trip-signal Z, moving it from its upper position (represented in Figs. 1, 4, and 5) to its lower position, Figs. 23 and 24, or the reverse. The pinion 76 is splined to the shaft P and is held in place in line with the crank-wheel 77 by a split pin 80 and a washer or pair of washers 81. The pitman 78 is secured on the crank-pin in like manner and is pivoted to the slide 79 by a shouldered screw 82, Figs. 24 and 29. A guide-rod 83 for the slide 79 is supported at its lower end on the housing 69 and at its upper end by a post 84, Figs. 4 and 5, attached by screws to the back plate $a$ and serving additionally to support the dial-plate $b$ and glass front plate $c$ within the sheet-metal drum $d$ of the register-casing, as in Fig. 4.

Figure 23:
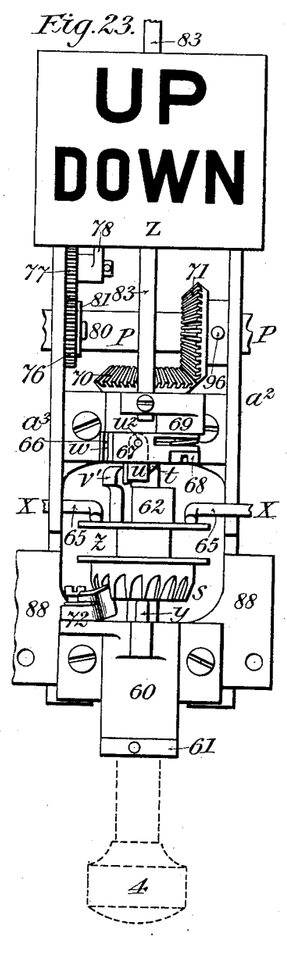
Fig. 23 is a fragmentary face view behind the dial-plate, showing the setting mechanism as it appears when the trip-registers are approaching zero with the setting-signal in its lowered position.

Additional supports 85, Figs. 4 and 5, &c., for the dial-plate $b$ and glass front plate $c$ are conveniently attached to the housings or frames $a^4$, Figs. 30 and 31, of the permanent registers or totalizers T, which are detachably fastened in place as parts of the register by means of these frames $a^4$ and screws 86 and 87, attaching the same to the framepieces $a^2$ and $a^3$, which are provided with rests 88, Fig. 23, for the same. A splicing-lug 89 on each of the frames $a^4$ substantially in the line of strain of the spur-gearing S, through which the permanent register is operated, coacts with one of said attaching-screws 87 to insure the perfect mesh of this gearing, notwithstanding the detachability of the permanent register. In the left frame $a^4$ the same forms a cross-drilled boss to receive one end of the rod 90, on which the sleeve-shaft of the numeral-wheels of the permanent register is mounted, together with a split pin 91 to hold it in place. The parallel rod 92, Fig. 31, on which the carrying-pinions of the register are mounted, is held in place in substantially the same manner, having a countersunk head at its inner end and being crossed by a split pin 93 at its outer end. The right frame $a^4$ has a splicing-lug 89, somewhat differently arranged from that of the left frame, as in Fig. 31, but substantially coincident with the line of strain of the spur-gearing S, and its rod 90 is held in place by a split pin 91 at each end.

Apart from being "right" and "left," respectively, in shape, the two frames $a^4$ are substantially identical in function and shape, and the mechanisms of the two permanent registers are of one and the same pattern, familiar to those skilled in the art.

The first gear of the spur-gearing S of each registering-train is pinned fast to the ratchet-wheel O of that train, the intermediate gear turns on the shouldered screw 43, upon which the safety-dog W of that train swings, and the last gear is pinned fast to the web of the units-wheel of the appropriate permanent register T and separates therewith from the remainder of the train. By so detaching the permanent registers T the locking devices X are exposed, so as to be fully inspected and removed, if need be, together with the pivot-screw and spring of the pawl 72 of the setting mechanism, which greatly facilitates inspection and repairs.

By withdrawing a split pin 94 from the pivot-rod 48 after detaching a permanent register the locking device X above it may be quickly removed. The detent-pawls U U² and their appurtenances may be detached in like manner by withdrawing split pins 95, Fig. 4, by which their pivot-rods 28 are held in place, and the trip-register wheels R R² may then be removed themselves by simply withdrawing the split pin 80 and the pin 96, by which the bevel-gear 71 is held in place, and withdrawing the shaft P endwise. Nearly the entire register may thus be taken apart without removing any screws except those which attach the permanent registers T.

Details which have not been specified are or may be of well-known construction and operation.

Springs and like parts may be of other forms as preferred by different manufacturers. The number of the register-wheels R R² may be increased, and those of the permanent registers T may be either increased or reduced in number. One of the registering-trains may obviously be used alone, or more than two trains may be combined in one register. The external form of the register, especially as thus reduced or enlarged, may be rectangular instead of round, and other like modifications will suggest themselves to those skilled in the art.

Having thus described said improvement, I claim as my invention and desire to patent under this specification—

1. The combination, in a fare-register, of a pair of actuators movable individually at will, a lever cross-bar connecting said actuators, a spring connected centrally with said cross-bar and therethrough with said actuators, a pair of registering-trains for the registration of two kinds of fares, as "cash fares" and "transfers," and means for transmitting registering impulses from the respective actuators to said trains respectively.

2. The combination, in a fare-register, of a pair of actuators movable individually at will, a lever cross-bar connecting said actuators, a spring connected centrally with said cross-bar and therethrough with said actuators, a pair of registering-trains each comprising a trip-register and a permanent register, and means for transmitting registering impulses from the respective actuators to said trains respectively.

3. The combination, in a fare-register, of a pair of actuators movable individually at will, a lever cross-bar connecting said actuators, a spring connected centrally with said cross-bar and therethrough with said actuators, a pair of registering-trains, bell mechanism for each train, and means for transmitting impulses from each of said actuators to the corresponding one of said trains and its bell mechanism.

4. The combination, in a fare-register, of a mainspring, means for energizing said spring comprising an actuator-slide, means for transmitting registering impulses therefrom comprising a spring-pressed main pawl carried by said slide and provided with a laterally-projecting stud-pin and a ratchet-wheel or ratchet-wheels engaged by said pawl, and a relatively-fixed incline coacting with said stud whereby said pawl is guided out of contact with said wheel or wheels during the spring-energizing strokes of said slide.

5. The combination, in a fare-register, of a mainspring, means for energizing said spring comprising an actuator-slide, means for transmitting registering impulses therefrom comprising a spring-pressed main pawl carried by said slide, a pair of ratchet-wheels engaged in common by said pawl, a trip-register and a permanent register to whose units-wheels said ratchet-wheels are respectively connected, and means for insuring complete reciprocations of said slides.

6. The combination, in a fare-register, of a mainspring, means for energizing said spring comprising an actuator-slide, means for transmitting registering impulses therefrom comprising a spring-pressed main pawl carried by said slide, a ratchet-wheel engaged by said pawl, register-wheels to whose units-wheel said ratchet-wheel is connected, a spring-pressed lever-pawl engaging said ratchet-wheel, a bell-hammer and bell, and devices connecting said lever-pawl and bell-hammer.

7. The combination, in a fare-register, of a mainspring, means for energizing said spring and transmitting registering impulses therefrom comprising an actuator-slide, a spring-pressed main pawl carried by said slide, a ratchet-wheel engaged by said pawl, register-wheels to whose units-wheel said ratchet-wheel is connected, a spring-pressed lever-pawl engaging said ratchet-wheel, a bell-hammer and bell, a framepiece interposed between said lever-pawl and bell-hammer and provided with a slot and stop for the latter, and a slot-and-pin connection between said lever-pawl and bell-hammer.

8. The combination, in a fare-register, of a mainspring, means for energizing said spring and transmitting registering impulses therefrom comprising an actuator-slide, a spring-pressed main pawl carried by said slide, a ratchet-wheel engaged by said pawl, register-wheels to whose units-wheel said ratchet-wheel is connected, a spring-pressed lever-pawl engaging therewith, a bell-hammer and bell, a rock-shaft carrying said bell-hammer and having a pair of crank-arms, a slot-and-pin connection between said lever-pawl and one of said crank-arms, a hole-and-pin connection between the other crank-arm and the bell-hammer, and a pair of framepieces one of which is provided with a stop for said bell-hammer.

9. The combination, in a fare-register, of a mainspring, means for energizing said spring and transmitting registering impulses therefrom comprising an actuator-slide, a spring-pressed main pawl carried by said slide, a pair of ratchet-wheels engaged in common by said pawl, a trip-register and a permanent register to whose units-wheels said ratchet-wheels are respectively connected, a safety-dog engaging the peripheries of both ratchet-wheels, and means for periodically pressing said dog against the teeth of said ratchet-wheels to correct their alinement.

10. The combination, in a register, of a numeral-wheel having a laterally-projecting rim provided internally with radial stops, means for rotating said wheel step by step, a locking device comprising a rock-shaft parallel to the axis of said wheel having an arm to interlock with said stops, a spring pressing said arm into the path of said stops, and means for periodically retracting said arm to unlock said numeral-wheel.

11. The combination, in a register, of a pair of numeral-wheels having laterally-projecting rims provided internally with radial stops, a locking device comprising a rock-shaft parallel to the axis of said wheels having arms the extremities of which are rebent toward each other, a spring pressing said extremities into the paths of said stops, and means for periodically oscillating the locking device to unlock said wheels.

12. The combination, in a register, of a pair of numeral-wheels provided with stops, a locking device comprising a rock-shaft parallel to the axis of said wheels provided with arms adapted to interlock with said stops, a spring pressing said arms into the paths of said stops, means for periodically releasing said wheels comprising a lever-arm on said rock-shaft, and means for rotating said wheels step by step comprising an actuator-slide having an incline to coact with said lever-arm.

13. The combination, in a register, of a pair of numeral-wheels provided with stops, a locking device comprising a rock-shaft parallel to the axis of said wheels provided with arms to engage said stops, a spring pressing said arms into the paths of said stops, means for periodically retracting said arms comprising a lever-arm on said rock-shaft, means for rotating said wheels step by step comprising a mainspring, and devices transmitting registering impulses therefrom including an actuator-slide which serves also to energize said spring by its alternate strokes and is provided with an incline to coact with said lever-arm at the end of each spring-energizing stroke.

14. The combination, in a register, of a pair of numeral-wheels, means for rotating the same step by step comprising a reciprocating actuator, a spring-pressed pawl carried by said actuator, and a ratchet-wheel engaged by said pawl and that carries the units-wheel, a clutch-slide carried by said units-wheel and having a projection that is engaged after every ninth registration by said pawl to interlock said clutch-slide with the tens-wheel, and means for retracting said slide and disconnecting it from the tens-wheel when said pawl is retracted after each tenth registration.

15. The combination, in a register, of a pair of numeral-wheels having laterally-projecting rims that form a closed recess between their webs, means for rotating said wheels step by step comprising a reciprocating actuator, a spring-pressed pawl carried by said actuator, and a ratchet-wheel engaged by said pawl and that carries the units-wheel, a clutch-slide carried by said units-wheel within said recess, and having a projection that protrudes through a hole in the web of said units-wheel in line with one of the interdental notches of said ratchet-wheel and is engaged by said pawl after each ninth registration to interlock said clutch-slide with the tens-wheel, and means for retracting said clutch-slide to disconnect it from said tens-wheel after each tenth registration.

16. The combination, in a register, of a pair of numeral-wheels having laterally-projecting rims that form a closed recess between their webs, the rim of the tens-wheel being provided internally with inwardly-projecting spurs, a spring-retracted clutch-slide carried by the units-wheel within said recess, and having a projection that protrudes through a hole in the web of said units-wheel, and means engaging with said projection, and thereby moving said clutch-slide to interlock it with one of said spurs of the tens-wheel preliminary to each tenth registration.

17. In a fare-register, the combination with a pair of trip-registers of means for actuating the same step by step comprising a pair of reciprocating slides arranged parallel to each other with a space between and constructed with lugs at their inner edges, means for setting said registers to zero after each trip comprising a radial setting-shaft parallel to said slides, a spring and appurtenances pressing said shaft inwardly endwise, a clutch-slide carried by said setting-shaft constructed with a circumferential groove, and an actuator-lock having an arm engaging said groove and a pair of legs that swing into the paths of said lugs on the actuator-slides when the setting-shaft is pressed inward.

18. In a fare-register, the combination with trip-register wheels provided with stops, of means for actuating said wheels and means for locking the wheels after each actuation, the latter comprising a rock-shaft parallel to the axis of said wheels having spring-pressed arms that project into the paths of said stops, and means for unlocking and setting said wheels comprising a protruding setting-knob, an inwardly-yielding setting-shaft moved by said knob, and devices moved by said shaft whereby said arms are simultaneously retracted when the knob is pressed inward.

19. In a fare-register, the combination with one or more pairs of trip-register wheels and means for actuating the same of setting mechanism for turning said wheels to zero after each trip comprising a protruding setting-knob, an inwardly-yielding setting-shaft moved by said knob and rendered free to rotate by its inward movement, a clutch-slide carried by said shaft and a normally-stationary inner clutch member interlocked by said movement, a zero-stop unlocked by said movement, normally-stationary bevel-gearing and a normally-stationary shaft for said wheels for transmitting motion from said inner clutch member, and means for transmitting motion from the shaft last named to the respective register-wheels.

20. In a fare-register, the combination with one or more pairs of trip-register wheels and means for actuating the same of setting mechanism for turning said wheels to zero after each trip comprising a protruding setting-knob, an inwardly-yielding setting-shaft moved by said knob and rendered free to rotate by its inward movement, a clutch-slide carried by said shaft and a normally-stationary inner clutch member interlocked by said movement, a zero-stop unlocked by said movement, normally-stationary bevel-gearing and a normally-stationary shaft for said wheels for transmitting motion from said inner clutch member, a setting-cam for each pair of wheels carried by the shaft last named, and setting-dogs carried by the respective wheels and engaged by said cam.

21. In a fare-register, the combination with one or more pairs of trip-register wheels each having laterally-projecting rims that form a closed recess between their webs, and means for actuating the same, of setting mechanism for turning said wheels to zero after each trip comprising a protruding setting-knob, an inwardly-yielding setting-shaft moved by said knob and rendered free to rotate by its inward movement, a clutch-slide carried by said shaft and a normally-stationary inner clutch member interlocked by said movement, normally-stationary bevel-gearing and a normally-stationary shaft for said wheels for transmitting motion from said inner clutch member, a setting-cam within said recess of each pair of wheels, carried by the shaft last named, and setting-dogs carried by the respective wheels within said recess and engaged by said cam.

22. In a fare-register, the combination with a trip-register and means for actuating the same of means for setting said trip-register at zero after each trip, comprising a protruding setting-knob, a setting-shaft moved inwardly endwise and rotated by said knob, a clutch-slide carried by said setting-shaft and a normally-stationary inner clutch member interlocked by such inward movement, and a zero-stop composed of a peripheral shoulder on said inner clutch member, and a spring-pressed dog pivoted to the housing of said clutch member and having a lifting projection movable on a pivot by the coacting projection on the clutch-slide in bringing said shoulder against the nose of said dog at the conclusion of the setting operation.

23. In a fare-register, the combination with trip-register wheels and means for actuating the same of means for turning said wheels to zero after each trip, comprising a protruding setting-knob, a setting-shaft moved inwardly endwise and rotated by said knob, means for preventing the retraction of said shaft until the setting operation is completed, a rock-shaft having arms that are retracted by such inward movement, a stop-dog carried by each wheel and revolving in a path obstructed by said arms when so retracted, and a lug on each wheel against which said dog stops when the wheel is turned to zero.

24. In a fare-register, the combination with a pair or pairs of trip-register wheels having the web of each wheel provided with a pair of lugs and a stop-dog pivoted between them and spring-pressed against one of said lugs, of means for turning said wheels to zero after each trip comprising a protruding setting-knob and a setting-shaft moved inwardly endwise and rotated by said knob, means for preventing the retraction of said shaft until the setting operation is completed, and a rock-shaft having arms that are retracted by such inward movement into the paths in which such dogs revolve to coact with the latter for stopping the wheels individually at zero.

25. In a fare-register, the combination with parallel registering-trains each comprising a pair of trip-register wheels of means for turning said wheels to zero at the end of each trip comprising a protruding knob, a setting-shaft rotated by said knob, means for transmitting such rotation from said setting-shaft to said wheels at the setting operation comprising a normally-stationary shaft for said wheels, a direction-indicating trip-signal and mechanism transmitting motion from said normally-stationary shaft to said signal for changing its indication at the end of each trip.

26. In a fare-register, the combination with an actuator and pawl-and-ratchet devices for transmitting registering impulses therefrom of trip-register wheels and their appurtenances including a back plate and frame-pieces which support all the parts of the trip-register mechanism, a permanent register having its axis of rotation parallel to that of said register-wheels and a distinct housing or frame detachable at will from said frame-pieces, a train of spur-gearing, the last gear of which is fast to the units-wheel of said permanent register and separable therewith, for transmitting the registering impulses from the axis of said register-wheels to said permanent register when the latter is in working position, substantially as hereinbefore specified.

ANTON E. NIELSEN.

Witnesses:
JAS. L. EWIN,
WALTER BRYERS.